US009050560B2

(12) United States Patent
Wasow et al.

(10) Patent No.: US 9,050,560 B2
(45) Date of Patent: Jun. 9, 2015

(54) METHOD FOR MINIMIZING THE DIAMETER OF A UREA SOLUTION, UREA SOLUTION AND USE OF A SURFACTANT IN UREA SOLUTION

(75) Inventors: Günther Wasow, Berlin (DE); Ernst Olav Strutz, Eiksmarka (NO)

(73) Assignee: YARA INTERNATIONAL ASA, Oslo (NO)

( * ) Notice: Subject to any disclaimer, the term of this patent is extended or adjusted under 35 U.S.C. 154(b) by 992 days.

(21) Appl. No.: 13/123,947

(22) PCT Filed: Oct. 13, 2009

(86) PCT No.: PCT/NO2009/000358
§ 371 (c)(1),
(2), (4) Date: Jun. 8, 2011

(87) PCT Pub. No.: WO2010/044676
PCT Pub. Date: Apr. 22, 2010

(65) Prior Publication Data
US 2011/0233461 A1   Sep. 29, 2011

(30) Foreign Application Priority Data

Oct. 14, 2008   (NO) .................................. 20084298

(51) Int. Cl.
| | | |
|---|---|---|
| B08B 3/04 | (2006.01) | |
| C11D 1/72 | (2006.01) | |
| C11D 3/26 | (2006.01) | |
| B01D 53/86 | (2006.01) | |
| B01D 53/90 | (2006.01) | |
| F01N 3/20 | (2006.01) | |

(52) U.S. Cl.
CPC ............ B01D 53/8625 (2013.01); B01D 53/90 (2013.01); B01D 2251/2067 (2013.01); B01D 2251/21 (2013.01); F01N 3/2066 (2013.01); F01N 2610/02 (2013.01); Y02T 10/24 (2013.01)

(58) Field of Classification Search
CPC .......... B01D 53/86; B01D 53/90; C09K 3/00; C11D 3/42
USPC ............. 510/442, 423, 501; 423/235; 44/302, 44/417
See application file for complete search history.

(56) References Cited

U.S. PATENT DOCUMENTS

| | | | | |
|---|---|---|---|---|
| 5,441,713 | A * | 8/1995 | Dubin et al. ................... | 423/235 |
| 5,489,419 | A | 2/1996 | Diep et al. | |
| 5,536,482 | A * | 7/1996 | Diep et al. ..................... | 423/235 |
| 7,947,241 | B2 | 5/2011 | Schmelzle et al. | |
| 2004/0123515 | A1 * | 7/2004 | Krogh et al. ................... | 44/335 |

FOREIGN PATENT DOCUMENTS

| | | |
|---|---|---|
| CN | 1145582 | 3/1997 |
| CN | 101255383 | 9/2008 |
| FR | 0701305 | 5/2008 |
| FR | 2 911 932 | 8/2008 |
| FR | 2 912 932 | 8/2008 |
| FR | 2912932 | 8/2008 |
| FR | 2 914 688 | 10/2008 |
| WO | 00/30733 | 6/2000 |
| WO | 2008/125745 | 10/2008 |

OTHER PUBLICATIONS

International Search Report issued Jan. 20, 2010 in International (PCT) Application No. PCT/NO2009/000358.
PCT Written Opinion issued Jan. 20, 2010 in International (PCT) Application No. PCT/NO2009/000358.
English translation of Chinese Office Action issued Jan. 18, 2013 in corresponding Chinese Patent Application No. 200980140039.0.
Office Action issued Aug. 11, 2014 in corresponding Indian Patent Application No. 7593/DELNP/2010.
Mesure de la Tension Superficielle Dynamique, Memoire de Projet en Laboratoire, Universite de Technologie de Compiegne, Dess "Physicochimie des Surfaces, Systèmes Colloïdaux et Fluides Composites", Blaise Meunier & Thierry Noël, Determination des Tensions Interfaciales en Mode Dynamique par la Methode de la Pression de Bulle Maximale, Soutenu le Dec. 22, 1999.
Sasol reaching new frontiers, Sasol Olegins & Surfactants, Isotridecanol Ethoxylates, MARLIPAL® O13.
Rapport d'Essais D13, Determination de la Tension superficielle a l'Aide du Tensiometre a Goutte Tracker de Teclis, Principe de la Methode.
Teclis Innovative Interface Science Rapport d'Analyse, "Mesure de la tension superficielle avec le maximum bubble pressure".
Collaboration Total-Coria, Recueil des résultats, "Granulométrie par Diffraction Laser de Cinq Formulations d'Adblue Additivées", Christophe Dumouchel, Denis Lisiecki, Mar. 20, 2014.
ISO 22241-1:2006, Oct. 2006.
A. Sundaram et al., "Influence of Adjuvants on Physiochemical Properties, Droplet Size Spectra and Deposit Patterns: Relevance in Pesticide Applications, " J. Environ. Sci. Health, B22(3), pp. 319-346 (1987).
R. Miller et al., "Dynamic surface tension determination using an automated bubble pressure tensionmeter," Physikalische Chemie/Physical Chemistry, Tenside Surf. Det. 34, pp. 357-363 (1997).
Proceedings of the 5th Joint ASME/JSME Fluids Engineering Summer Conference, 2007, vol. 1, Part B, "Fundamental Issues and Perspectives in Fluid Mechanics," pp. 1653-1656.
Rapport D'Essais D13, Determination de la Tension Superficielle a l'Aide du Tensiometre a Goutte Tracker de Teclis, Principe de la Methode
European Patent Office Communication of a notice of opposition issued Jun. 18, 2014 in corresponding European Patent Application No. 09752000.1.
PACT-IP innovation competence group, Notice of oppostion issued le Jun. 9, 2014.

(Continued)

*Primary Examiner* — Mark Kopec
(74) *Attorney, Agent, or Firm* — Wenderoth, Lind & Ponack, L.L.P.

(57) ABSTRACT

A mixture of surfactants from alkylene oxide adducts with different degrees of alkoxylation is used in a urea solution to be added to an exhaust stream for reduction of nitrous gases.

18 Claims, No Drawings

(56) References Cited

OTHER PUBLICATIONS

European Patent Office Opposition a un brevet europeen issued Sep. 11, 2013 in corresponding European Patent Application No. 09752000.1.

Dumouchel et al., "Granulometry by Laser Diffraction of Five Formulatins of Adblue Additives", Total-Coria Collaboration, May 20, 2014, pp. 1-16, English translation.

Test Report D13, Determination of Surface Tension Ussing the Drop Tensiometer Tracker From Teclis, Principle of the Method, English translation.

Teclis Innovative Interface Science, Analysis Report, "Measurement of Surface Tension with maximum Bubble Pressure", English translation.

Meunier et al., Measurement of Dynamic Surface Tension "Determination of Interfacial Tensions in Dynamic Mode by the Method of Maximum Bubble Pressure" Memorandum of a Laboratory Project Compiegne Technology University, Dec. 22, 1999, English translation.

Notice of Opposition from PACT-IP innovation competence group dated Jun. 9, 2014.

Communication from PACT-IP innovation competence group dated Jul. 1, 2014.

\* cited by examiner

METHOD FOR MINIMIZING THE DIAMETER OF A UREA SOLUTION, UREA SOLUTION AND USE OF A SURFACTANT IN UREA SOLUTION

Combustion devices and incinerators have to be run with a slight surplus of air for avoiding or keeping low the proportion of non-burnt components like soot or carbon monoxide.

Nitrogen and the surplus of oxygen react at the high temperature of combustion with each other forming NO und $NO_2$, the so-called nitrous gases.

These nitrous gases are poisons to the environment and therefore have to be disposed. This can be done by a catalytic controlled reaction with ammonia after the equations:

$$6NO + 4NH_3 = 5N_2 + 6H_2O \text{ resp.}$$

$$6NO_2 + 8NH_3 = 7N_2 + 12H_2O$$

Ammonia by itself is a volatile, corrosive and poisonous substance; therefore in general urea is used, which is broken down to ammonia and carbon dioxide.

An aqueous urea solution is therefore atomized with the help of a narrow nozzle and sprayed into the exhaust stream. The diameter of the droplets has to be very small to achieve a high temperature in a short time in the exhaust stream, thus leading to a thorough hydrolysis of urea.

$$NH_2CONH_2 + H_2O = 2NH_3 + CO_2$$

Bigger droplets may stick to the wall or material of the catalyst if the droplets are not evenly distributed. In this case the water evaporates quickly in the hot exhaust stream and other reactions will take place.

Dimerisation of urea is the first step, biuret is formed and ammonia is split off.

$$2NH_2CONH_2 = NH_2CONHCONH_2 + NH_3$$

Biuret can be hydrolyzed to $NH_3$ und $CO_2$ too. This reaction however, will not take place in practice because there is no more any water in the internal part of the dried droplets. Instead melamine is formed in a consequent reaction.

The urea solution has to be sprayed into the exhaust stream in a very fine distribution. The technical conditions are often a compromise due to a compact construction and technologic parameters like spraying pressure and nozzle diameter. Therefore, the urea solution has to possess optimal properties for being used in different types of vehicles and different exhaust systems.

Furthermore, the urea solution has to be kept soluble even at temperatures below 0° C. The freezing point of a 32.5% urea solution is about −11° C. The additive should not precipitate under such conditions.

Lowering of the surface tension of a urea solution can be achieved by addition of many surfactants as described in the patent literature.

From International patent application WO94/08893 it is known a process and composition for NOx reduction by selective non-catalytic reduction in the gas phase. It is used a pollutant reducing agent together with a surfactant. The reducing agent is selected from the group consisting of ammonia, ammonia precursors, urea, urea precursors, urea hydrolysis products, carbamates, ammonium carbonate, ammonium bicarbonate, cyanurates, ammonium salts of organic acids, other amidozine-generating compositions and mixtures of these. The surfactant is an anionic, cationic or nonionic compound. Preferably, the surfactant is selected from $C_{11}$-$C_{15}$ secondary alcohol ethoxylates, $C_{12}$-$C_{15}$ linear primary alcohol ethoxylates, alkylated diphenyl oxide disulfonates and nonyl phenol ethoxylated ethanol and having an HLB (hydrophilic/lipophilic balance) from about 10-20. No mixtures are disclosed. These products show a measureable depression in the state of equilibrium.

French patent application 2912932 describes an aqueous solution for the treatment of diesel engine exhaust gases by selective catalytic reduction (SCR). In certain configurations of installation of the SCR and urea injection, there occurred deposits in the exhaust pipes which can plug the pipe. These deposits are mainly made up of cyanuric acid of the incomplete decomposition of urea. In order to strongly limit the deposits it is used an aqueous solution of urea and its derivates. To obtain a reduction in the deposits, the poly-functional additive is preferably selected among surface-active neutral, ionic and the amphoteric soluble ones in water. The poly-functional additive should have a HLB between 7 and 17.

The achieved depression in the state of equilibrium known is not sufficient for the desired use in the present invention. Following the prior art, only a small reduction in droplet size is obtained. And a strong reduction of the droplet diameter needs a very low dynamic surface tension. Some of the compositions disclosed in the prior art will moreover harm the catalyst if used in SCR.

The object of the invention is to obtain a urea solution to be used for reducing the amount of nitrogen oxides in exhaust gases by SCR. Another object of this invention is to achieve an even distribution of urea droplets with extraordinary small diameters by influencing the spraying conditions by supplying an additive to the urea solution. In this way all drops are swept along with the exhaust stream undergoing a fast hydrolysis. It is also important to be able to use an additive efficient in small concentrations to avoid deposits. The additive should not be aggressive to the catalytic material and be able to be stored down to −11° C. without precipitation.

These and other objects of the invention are obtained with the method, composition and use as described below. The invention is further characterised by the patent claims.

There are two kinds of nozzles for atomizing a liquid. In the first case the liquid is torn to fine droplets by a fast stream of air or other gases, in the other case the stream of the liquid itself is pressed through a narrow nozzle with high speed and thus swirled into fine droplets.

It is known to achieve extraordinary small droplets by reduction of the viscosity of the liquid. In the same way a reduction of the surface tension influences the diameter of the droplets.

This principle is used for spraying of paints and varnishes. A fine spray followed by a quick rise of the viscosity by evaporation of a part of the diluents to achieve a tough sticking of the paint to the surface can be reached by a special composition of the diluents. An even wetting of the surface and fast spreading of the paint is controlled by a low surface tension of the paint or varnish.

Water possesses a relative high surface tension of ca. 73 mN/m at room temperature. Addition of surfactants to water or aqueous solutions gives a strong depression of the surface tension. Hydrophobic particles and hydrophobic droplets, e.g. soot or oil, are locked in the inner part of the micelles formed by the surfactants.

Addition of surfactants is therefore used for the production of emulsions, lotions and creams. The effectiveness of detergents and cleansing agents is also based on this effect.

The desired effect can be reached at relative low concentrations of $10^{-5}$ to $10^{-3}$ mol/l of surfactant dependent on the surface-active agent used. These substances are called 'surface active agents' or surfactants because they tend to move to the surface driven by energetic reasons. The concentration in the layers near to the surface can run up to 1000 times the bulk concentration. The transport of the surface active molecules to the surface is however a function of time, contrary to the depression of the surface tension by addition of organic solvents to water like methanol or ethanol (22.6 mN/m) or aceton (23.6 mN/m).

The surface tension in the equilibrium is controlled by the transport of the surfactants to the surface by Brown's molecular movement, which means the value is controlled by diffusion. Therefore, the surface tension occurring immediately after forming of a new surface is the decisive not the much lower value in the equilibrium. This means that a very fast reduction of the dynamic surface tension is important.

The volume of a liquid coming out of a nozzle will tear off by forming a droplet when the weight of the drop will overcome the surface tension that tries to minimize the surface. In that way the radius of the drop is directly controlled by the surface tension of the liquid immediately after leaving the nozzle. However, effectiveness and solubility of a surfactant in a concentrated urea solution show relevant differences compared to the solution of a surfactant in water.

The present invention relates to a method of minimizing the diameter of droplets of a urea solution by supplying an additive (called mixture of surfactants in the following) to the urea solution, thus achieving a significantly finer atomization than atomizing the same urea solution without any additive using the same spraying device. The invention also relates to the urea solution with surfactants and the use of the mixture of surfactants in a urea solution for minimizing the diameter of droplets of a urea solution added to an exhaust stream.

The mixture of surfactants consists of nonionic surfactants of different degrees of alkoxylation and is added to the urea solution in a proportion of 50 g/m$^3$ to 2000 g/m$^3$, preferably 150 to 300 g/m$^3$.

The said mixture of surfactants is formed from fatty alcohol ethylene oxide adducts and/or fatty amine ethylene oxide adducts and/or the responding propylene oxide adducts and/or so-called block polymers, achieved by reaction of ethylene oxide and propylene oxide, and/or ethoxylated alkyl phenols. The said mixture of surfactants contains a proportion of 10% to 40% of low alkoxylated compounds, possessing a fast rate of diffusion, e.g. a tridecanol with 2-5 groups of poly glycol, and a proportion of 60% to 90% with a higher degree of alkoxylation, e.g. a tridecanol with 8-20 groups of poly glycol, securing a sufficient solubility in the concentrated urea solution, even at temperatures below 0° C. The terminal OH-groups of the compounds can be reacted with a short chain alcohol forming ethers, thus reducing the foam ability.

Preferably the mixture of surfactants are made from ethylene oxide adducts of alcohols with an alkyl chain of 12-15 C-atoms and where the higher degree of alkoxylation is 10-15.

A preferred mixture of surfactants contains a proportion of 40% of an ethoxylated oxo alcohol with an alkyl chain of 13 C-atoms and a degree of ethoxylation of 5 and a proportion of 60% of an ethoxylated oxo alcohol with an alkyl chain of 13 C-atoms and a degree of ethoxylation of 10. Another mixture of surfactants contains a proportion of 33% of an ethoxylated oxo alcohol with an alkyl chain of 13 C-atoms and a degree of ethoxylation of 3 and a proportion of 67% of an ethoxylated oxo alcohol with an alkyl chain of 13 C-atoms and a degree of ethoxylation of 12.

The mixture of surfactants can furthermore contain glycerol or 100-2000 g/m$^3$ polyglycols with a relative molecular mass of 1000 to 10000 for dissolving or melting existing or arising deposits.

A low alkoxylated compound has a low dynamic surface tension, but is unfortunately not sufficiently soluble neither in water nor in urea solution. A cloudy solution is obtained. During storage it will separate into two phases, especially at low temperatures. We have found that an addition of a higher ethoxylated compound will act as a solubilizer. The insoluble parts will form the core of micelles and these micelles will be transported to the phase border, the surface. Compounds with branched alkyl chains show an even better solubility in urea solution. Lowering of the surface tension occurs by a monolayer of surfactants, whether they are soluble or not, in the bulk phase.

Outstanding spraying properties are also obtained by mixing a low and high ethoxylated compound. Such a solution can be used in different systems of nozzle diameters and spraying pressures. An additional effect occurs during storage at low temperatures. Most mixtures will remain as a clear solution down to −11° C., the eutectic point of urea and water. The specific mixture of surfactants makes it possible to achieve a fast depression of the surface tension only milliseconds after the urea solution has left the nozzle, securing a fast and complete hydrolysis of urea. In addition, the surfactants block the growth of micro crystals and therefore prevent forming of solid reaction products of urea.

Surface tension has been measured for a 32.5 weight % aqueous urea solution with ethoxylated alcohols with a mean chain length of 13 C-atoms with different degrees of ethoxylation and added in different quantities. The surface tension of these solutions was determined by the stalagmometer method. The time between falling drops lay by approximately 500 msec. The results are shown in Table 1.

TABLE 1

Surface tension of ethoxylated alcohols with different degree of ethoxylation dissolved in urea solution.

| Surfactant | σ [mN/m] at 100 mg/l | σ [mN/m] at 250 mg/l | σ [mN/m] at 500 mg/l |
|---|---|---|---|
| Marlipal* O13/30 | 35.60 | 28.15 | 24.75 |
| Marlipal O13/50 | 40.20 | 28.85 | 25.00 |
| Marlipal O13/60 | 38.20 | 29.50 | 25.15 |
| Marlipal O13/70 | 38.25 | 30.05 | 25.40 |
| Marlipal O13/80 | 38.70 | 30.95 | 25.60 |
| Marlipal O13/90 | 37.75 | 31.90 | 25.60 |
| Marlipal O13/109 | 42.70 | 35.90 | 26.40 |
| Marlipal O13/129 | 47.65 | 39.75 | 28.15 |

*Marlipal is a trademark from Sasol. The term O13 stands for a mean alkyl chain length of alcohols from the so-called oxo-synthesis. The last number after the slash stands for the concentration with 0 for 100% and 9 for 90%. The numbers 3 to 12 after the slash stand for the mean number of added ethylene oxide (EO) per molecule.

The products of the Marlipal® O13 series are alkylpolyethylene glycol ethers and belong to the class of nonionic surfactants. Isotridecanol, a $C_{13}$-oxo alcohol prepared from a $C_{12}$-olefin mixture, is the synthetic alcohol on which these products are based.

The individual grades of the Marlipal® O13 series differ in the number n of the adducted moles of ethylene oxide:

$$R(OCH_2CH_2)_nOH$$

R=$C_{1-3}$-alkyl n=3-12, number of added moles of ethylene oxide, degree of ethoxylation.

The individual grades differ in the number n of added moles of ethylene oxide and, accordingly, in the length of the polyethylene glycol ether chain. The letter n denotes the average degree of ethoxylation, since a whole range of ethoxylation stages during the preparation. The Marlipal®

O13 grades are thus, like all alcohol ethoxylates, mixtures of homologous alkylpolyethylene glycol ethers.

The Maprimal® range is classified by a code system which is descriptive of the composition of the surfactant. Accordingly, the extension O13 denotes the $C_{13}$-oxo alcohol (isotridecanol). Numbers after the oblique denote the degree of ethoxylation n, 100% Maprimal® O13 grades additionally have a zero as the last digit. If on the other hand, the last digit is 9, the product contains 90% of alkylpolyglycol ethers and 10% of water. This addition of water produces liquid and homogeneous products with improved cold storage behavior.

| Product | Chemical Characterization |
|---|---|
| MARLIPAL ® O13/30 | Isotridecanol + 3 mol EO/mol |
| MARLIPAL ® O13/40 | Isotridecanol + 4 mol EO/mol |
| MARLIPAL ® O13/50 | Isotridecanol + 5 mol EO/mol |
| MARLIPAL ® O13/60 | Isotridecanol + 6 mol EO/mol |
| MARLIPAL ® O13/69*) | Isotridecanol + 6 mol EO/mol |
| MARLIPAL ® O13/70 | Isotridecanol + 7 mol EO/mol |
| MARLIPAL ® O13/79*) | Isotridecanol + 7 mol EO/mol |
| MARLIPAL ® O13/80 | Isotridecanol + 8 mol EO/mol |
| MARLIPAL ® O13/89*) | Isotridecanol + 8 mol EO/mol |
| MARLIPAL ® O13/90 | Isotridecanol + 9 mol EO/mol |
| MARLIPAL ® O13/99*) | Isotridecanol + 9 mol EO/mol |
| MARLIPAL ® O13/100 | Isotridecanol + 10 mol EO/mol |
| MARLIPAL ® O13/109*) | Isotridecanol + 10 mol EO/mol |
| MARLIPAL ® O13/120 | Isotridecanol + 12 mol EO/mol |
| MARLIPAL ® O13129*) | Isotridecanol + 12 mol EO/mol |
| MARLIPAL ® O13/939*) | Mixture of Isotridecanol Polyethylene Glycol Ethers |

*)90% supply form.

Specification of MAPRIMAL® O13 products are given in copies of current data sheets from the provider following the Examples of this description.

The figures given in the table is the mean value of 3 or 4 measurements.

Energy has to be put into a system for forming a new surface. The finer the droplets the larger is the fresh surface. A part of the energy put into the spraying equipment is needed to press the solution through the narrow nozzle overcoming the viscosity of the liquid; the remaining energy is used to disperse the bulk of solution coming out of the nozzle. Therefore, the lower the surface tension the more new surface is created with a given amount of energy. A first remarkable effect in drop diameter reduction by lowering the surface tension is obtained at 45 to 50 mN/m, while significantly smaller droplets are obtained with a surface tension of 28 to 35 mN/m. The results show that 100 mg/l is an insufficient surfactant concentration to obtain the preferred surface tensions. In addition, the species with 3, 5, 6 and 7 ethoxy groups are not sufficiently soluble.

The next step was to investigate surface tension for different surfactants and mixtures of the surfactants with different degrees of ethoxylation. The results are shown in Table 2.

TABLE 2

Typical values of surface tension by addition of 250 mg/l surfactant to the urea solution.

| Product | Surface tension, mN/m |
|---|---|
| Urea solution | 67.00 |
| Urea solution plus 250 mg/l C13 fatty alcohol•12 EO | 39.75 |
| Urea solution plus 200 mg/l C13 fatty alcohol•12 EO plus 50 mg/l C13 fatty alcohol•3 EO | 31.24 |

TABLE 2-continued

Typical values of surface tension by addition of 250 mg/l surfactant to the urea solution.

| Product | Surface tension, mN/m |
|---|---|
| Urea solution plus 175 mg/l C13 fatty alcohol•12 EO plus 75 mg/l C13 fatty alcohol•3 EO | 28.95 |
| Urea solution plus 250 mg/l C13 fatty alcohol•3 EO | 28.20 |

It was surprisingly found that addition of a nonionic surfactant with a higher degree of ethoxylation not only secured the necessary solubility, but that the resulting surface tension to a large extent is controlled by the surfactant with the lower degree of ethoxylation. The concentration of the sum of additives was not changed.

A similar result was obtained with a mixture of C13 fatty alcohol.10EO and C13 fatty alcohol.5EO as shown in Table 3.

TABLE 3

Typical values of surface tension by addition of 250 mg/l surfactant to the urea solution.

| Product | Surface tension, mN/m |
|---|---|
| Urea solution | 67.00 |
| Urea solution plus 250 mg/l C13 fatty alcohol•10 EO | 35.92 |
| Urea solution plus 200 mg/l C13 fatty alcohol•10 EO plus 50 mg/l C13 fatty alcohol•5 EO | 32.74 |
| Urea solution plus 175 mg/l C13 fatty alcohol•10 EO plus 75 mg/l C13 fatty alcohol•5 EO | 29.16 |
| Urea solution plus 250 mg/l C13 fatty alcohol•5 EO | 28.87 |

All mixtures are stable during storage down to −11° C. Further, the dynamic surface tension was measured. Surprisingly it was found that a surfactant mixture containing 25-40% of the low ethoxylated surfactant show after 5 to 50 milliseconds a much stronger depression of the surface tension than the single addition of a low ethoxylated product at the same concentration, see Table 4. That is the time region which is important for obtaining a drastical reduction of the droplet diameter. A size reduction of 65 to 75% can be obtained due to the synergistic action of the surfactant mixture of non-ionics with low and high degree of ethoxylation.

TABLE 4

Measurement of dynamic surface tension

| time [sec] | 250 mg/l Marlipal O13/12 EO | 250 mg/l Marlipal O13/3 EO | 175 mg/l Marlipal O13/12 EO + 75 mg/l Marlipal O13/3 EO |
|---|---|---|---|
| 0.005 | 55.2 | 47.2 | 44.7 |
| 0.010 | 46.5 | 38.4 | 34.8 |
| 0.050 | 43.0 | 34.0 | 31.4 |
| 0.100 | 42.0 | 31.8 | 30.8 |
| 0.500 | 40.9 | 30.6 | 30.1 |
| 1.000 | 40.1 | 28.6 | 29.4 |

The same synergistic effect was observed with a combination of 40% Marlipal 013/50 and 60% Marlipal 013/100 as shown in Table 5.

TABLE 5

Measurement of dynamic surface tension

| Time [sec] | 250 mg/l Marlipal O13/10 EO | 250 mg/l Marlipal O13/5 EO | 175 mg/l Marlipal O13/10 EO + 75 mg/l Marlipal O13/5 EO |
|---|---|---|---|
| 0.005 | 54.2 | 49.1 | 45.6 |
| 0.010 | 44.8 | 37.4 | 33.9 |
| 0.050 | 42.4 | 33.2 | 30.4 |
| 0.100 | 41.3 | 30.8 | 30.3 |
| 0.500 | 39.9 | 29.9 | 30.1 |
| 1.000 | 36.2 | 29.1 | 29.4 |

By this invention urea solutions with surfactants suitable for removal of NOx by selective catalytic reduction have been obtained. The surfactants are harmless to the catalyst and will evaporate or be burned to gaseous compounds harmless to the catalyst. An outstanding strong reduction of the dynamic surface tension is obtained milliseconds after a new surface is formed by spraying, using a synergetic effect between low and high ethoxylated compounds of the same species. A strong reduction of the surface tension is obtained already at low concentrations of the additive. Also a narrow distribution of droplet size is obtained because no bigger droplets will occur. The surfactants have a good solubility during storage at low temperatures down to $-11°$ C. Use of substances dangerous to the environment is also avoided.

The invention will be further illustrated by the following non-limiting examples:

EXAMPLE 1

175 g of ethoxylated oxo alcohol with an alkyl chain of 13 C-atoms and a degree of ethoxylation of 12 and 75 g of ethoxylated oxo alcohol with an alkyl chain of 13 C-atoms and a degree of ethoxylation of 3 are added to 1 m$^3$ of an aqueous urea solution of the concentration of 32.5 mass % of urea. The solution remains optical clear even at a temperature of $-11°$ C.

The surface tension of the urea solution is lowered from 67 mN/m to 28 mN/m. A spraying pattern test shows a strong reduction of the diameters of the droplets compared to a urea solution without the additive and even a finer distribution than an urea solution with 250 mg/l of an ethoxylated oxo alcohol with an alkyl chain of 13 C-atoms and a degree of ethoxylation of 12.

EXAMPLE 2

150 g of ethoxylated oxo alcohol with an alkyl chain of 13 C-atoms and a degree of ethoxylation of 10 and 100 g of ethoxylated fatty amine with an alkyl chain of 13 C-atoms and a degree of ethoxylation of 5 are added to 1 m$^3$ of an aqueous urea solution of the concentration of 32.5 mass % of urea. The solution remains optical clear even at a temperature of $-11°$ C.

The surface tension of the urea solution is lowered from 67 mN/m to 29 mN/m. A spraying pattern test shows a strong reduction of the diameters of the droplets compared to an urea solution without the additive and even a finer distribution than an urea solution with 250 mg/l of an ethoxylated oxo alcohol with an alkyl chain of 13 C-atoms and a degree of ethoxylation of 10.

EXAMPLE 3

400 g of ethoxylated nonylphenol with a degree of ethoxylation of 9 and 100 g of an ethoxylated oxo alcohol with an alkyl chain of 11 C-atoms and a degree of ethoxylation of 3 are added to 1 m$^3$ of an aqueous urea solution of the concentration of 32.5 mass % of urea. The solution remains clear even at a temperature of $-11°$ C. The surface tension of the urea solution is lowered from 70 mN/m to 27 mN/m. A spraying pattern test shows a very strong reduction of the diameters of the droplets compared to a urea solution without the additive.

EXAMPLE 4

250 g of ethoxylated oxo alcohol with an alkyl chain of 13 C-atoms and a degree of ethoxylation of 12 and 50 g of ethoxylated oxo alcohol with an alkyl chain of 13 C-atoms and a degree of ethoxylation of 5 are added to 1 m$^3$ of an aqueous urea solution of the concentration of 32.5 mass % of urea. The solution remains optical clear even at a temperature of $-11°$ C.

The surface tension of the urea solution is lowered from 70 mN/m to 29 mN/m. A spraying pattern test shows a strong reduction of the diameters of the droplets compared to a urea solution without the additive.

EXAMPLE 5

200 g of ethoxylated oxo alcohol with an alkyl chain of 13 C-atoms and a degree of ethoxylation of 12 and 50 g of ethoxylated fatty amine with an alkyl chain of 12 C-atoms and a degree of ethoxylation of 5 are added to 1 m$^3$ of an aqueous urea solution of the concentration of 32.5 mass % of urea. The solution remains optical clear even at a temperature of $-11°$ C.

The surface tension of the urea solution is lowered from 70 mN/m to 32 mN/m. A spraying pattern test shows a strong reduction of the diameters of the droplets compared to a urea solution without the additive.

EXAMPLE 6

500 g of poly ethylene glycols with molecular masses from 1000 g/mol to 10 000 g/mol are further added to a urea solution according to example 2. The properties referred to example 2 remain unchanged. A dissolving influence on condensation products of urea is additionally observable.

4.7 Technical Data of MARLIPAL ® O13 Products

| Product Name MARLIPAL ® | | O13/30 | O13/40 | O13/50 | O13/60 | O13/69 | O13/70 |
|---|---|---|---|---|---|---|---|
| Chemical Composition | C$_{13}$-Oxoalkohol + n mol EO/mol | n = 3 | n = 4 | n = 5 | n = 6 | n = 6 | n = 7 |

-continued

4.7 Technical Data of MARLIPAL ® O13 Products

| Technical Data | | | | | | | | |
|---|---|---|---|---|---|---|---|---|
| Appearance at 20° C. | | | liquid, clear-cloudy | liquid, clear-cloudy | liquid, clear-cloudy | liquid, clear-cloudy | liquid, clear | liquid, clear-cloudy |
| Iodine Colour Number | mg l/100 ml | | max. 2 | max. 2 | max. 2 | max. 2 | max. 2 | max. 2 |
| Cloud Point | 10% in 25% BDG solution | ° C. | 48-51 | 58-61 | 64-67 | 69-72 | 69-72 | 72-75 |
| | 2% in demin. Water | ° C. | — | — | — | — | — | — |
| | 2% in 10% NaCl solution | ° C. | — | — | — | — | — | — |
| pH Value | 2% in demin. Water | | 5-7 | 5-7 | 5-7 | 5-7 | 5-7 | 5-7 |
| Density | at 20° C. | g/ml | — | — | — | — | ca. 0.99 | — |
| | at 50° C. | g/ml | ca. 0.91 | ca. 0.92 | ca. 0.94 | ca. 0.95 | — | ca. 0.96 |
| Refractive Index n 20/D | | | — | — | — | — | ca. 1.450 | — |
| Refractive Index n 50/D | | | ca. 1.445 | ca. 1.446 | ca. 1.447 | ca. 1.448 | — | ca. 1.449 |
| Solidification Point[1] | | ° C. | <−20 | <−10 | ca. −5 | ca. +3 | <−20 | ca. +7 |
| Flash Point | ISO 2592 | ° C. | >130 | >150 | >150 | >150 | n.a. | >150 |
| Ignition Temperature | DIN 51794 | ° C. | ca. 320 | ca. 340 | ca. 345 | ca. 355 | ca. 355 | ca. 355 |
| Viscosity (Brookfield) | at 50° C. | mPa s | ca. 15 | ca. 18 | ca. 20 | ca. 20 | — | ca. 25 |
| | at 20° C. | mPa s | — | — | — | — | ca. 110 | — |
| Water | | % by weight | max. 0.5 | max. 0.5 | max. 0.5 | max. 0.5 | ca. 10 | max. 0.5 |
| Polyethylene Glycol | | % by weight | max. 2 | max. 2 | max. 2 | max. 2 | max. 2 | max. 2 |
| EO Content (calculated) | | % by weight | 39.8 | 46.8 | 52.4 | 56.9 | 56.9 | 60.6 |
| HLB Value (calculated) | | 20 × MW hydrophilic/ MW total | 8.0 | 9.4 | 10.5 | 11.4 | 11.4 | 12.1 |
| Hydroxyl Number | | mg KOH/g | ca. 165 | ca. 150 | ca. 135 | ca. 120 | — | ca. 110 |

| | Product Name MARLIPAL ® | | O13/79 | O13/80 | O13/89 | O13/90 | O13/99 | O13/100 |
|---|---|---|---|---|---|---|---|---|
| Chemical Composition | $C_{13}$-Oxoalkohol + n mol EO/mol | | n = 7 | n = 8 | n = 8 | n = 9 | n = 9 | n = 10 |
| Technical Data | | | | | | | | |
| Appearance at 20° C. | | | liquid, clear | liquid, clear-cloudy | liquid, clear | liquid, clear-cloudy | liquid, clear | liquid, clear-cloudy |
| Iodine Colour Number | mg l/100 ml | | max. 2 | max. 2 | max. 2 | max. 2 | max. 2 | max. 2 |
| Cloud Point | 10% in 25% BDG solution | ° C. | 72-75 | 76-78 | 76-78 | — | — | — |
| | 2% in demin. Water | ° C. | — | — | — | 56-59 | 56-59 | 74-77 |
| | 2% in 10% NaCl solution | ° C. | — | — | — | — | — | — |
| pH Value | 2% in demin. Water | | 5-7 | 5-7 | 5-7 | 5-7 | 5-7 | 5-7 |
| Density | at 20° C. | g/ml | ca. 0.99 | — | ca. 1.01 | — | ca. 1.02 | — |
| | at 50° C. | g/ml | — | ca. 0.97 | — | ca. 0.98 | — | ca. 0.99 |
| Refractive Index n 20/D | | | ca. 1.453 | — | ca. 1.453 | — | ca. 1.453 | — |
| Refractive Index n 50/D | | | — | ca. 1.450 | — | ca. 1.451 | — | ca. 1.452 |
| Solidification Point[1] | | ° C. | <−10 | ca. +11 | <−10 | ca. +13 | <−10 | ca. +17 |
| Flash Point | ISO 2592 | ° C. | n.a. | >150 | n.a. | >180 | n.a. | >180 |
| Ignition Temperature | DIN 51794 | ° C. | ca. 355 | ca. 360 | ca. 360 | ca. 360 | ca. 360 | ca. 360 |
| Viscosity (Brookfield) | at 50° C. | mPa s | — | ca. 30 | — | ca. 30 | — | ca. 35 |
| | at 20° C. | mPa s | ca. 120 | — | ca. 130 | — | ca. 150 | — |
| Water | | % by weight | ca. 10 | max. 0.5 | ca. 10 | max. 0.5 | ca. 10 | max. 0.5 |
| Polyethylene Glycol | | % by weight | max. 2 | max. 2 | max. 2 | max. 2 | max. 2 | max. 2 |
| EO Content (calculated) | | % by weight | 60.6 | 63.8 | 63.8 | 66.4 | 66.4 | 68.7 |
| HLB Value (calculated) | | 20 × MW hydrophilic/ MW total | 12.1 | 12.8 | 12.8 | 13.3 | 13.3 | 13.7 |
| Hydroxyl Number | | mg KOH/g | — | ca. 100 | — | ca. 95 | — | ca. 90 |

| | Product Name MARLIPAL ® | | O13/109 | O13/120 | O13/129 | O13/939 |
|---|---|---|---|---|---|---|
| Chemical Composition | $C_{13}$-Oxoalkohol + n mol EO/mol | | n = 10 | n = 12 | n = 12 | |

-continued

4.7 Technical Data of MARLIPAL ® O13 Products

| Technical Data | | | | | | |
|---|---|---|---|---|---|---|
| Appearance at 20° C. | | | liquid, clear | liquid, pasty | liquid, clear | liquid clear |
| Iodine Colour Number | mg I/100 ml | | max. 2 | max. 2 | max. 2 | max. 2 |
| Cloud Point | 10% in 25% BDG solution | ° C. | — | — | — | 70-72 |
| | 2% in demin. Water | ° C. | 74-77 | — | — | — |
| | 2% in 10% NaCl solution | ° C. | — | 54-57 | 54-57 | — |
| pH Value | 2% in demin. Water | | 5-7 | 5-7 | 5-7 | 5-7 |
| Density | at 20° C. | g/ml | ca. 1.03 | — | ca. 1.03 | ca. 0.99 |
| | at 50° C. | g/ml | — | ca. 1.00 | — | — |
| Refractive Index n 20/D | | | ca. 1.453 | — | ca. 1.454 | ca. 1.451 |
| Refractive Index n 50/D | | | — | ca. 1.453 | — | — |
| Solidification Point[1] | | ° C. | ca. −6 | ca. +20 | ca. −3 | <−10 |
| Flash Point | ISO 2592 | ° C. | n.a. | >180 | n.a. | n.a. |
| Ignition Temperature | DIN 51794 | ° C. | ca. 360 | ca. 360 | ca. 360 | ca. 355 |
| Viscosity (Brookfield) | at 50° C. | mPa s | — | ca. 40 | — | — |
| | at 20° C. | mPa s | ca. 160 | — | ca. 170 | ca. 100 |
| Water | | % by weight | ca. 10 | max. 0.5 | ca. 10 | ca. 10 |
| Polyethylene Glycol | | % by weight | max. 2 | max. 2 | max. 2 | max. 2 |
| EO Content (calculated) | | % by weight | 68.7 | 72.5 | 72.5 | 57.5 |
| HLB Value (calculated) | | 20 × MW hydrophilic/ MW total | 13.7 | 14.5 | 14.5 | 11.5 |
| Hydroxyl Number | | mg KOH/g | — | ca. 75 | — | — |

Specifications of MARLIPAL ® O13 products are given in the current product data sheets.
[1] Determination under laboratory conditions (see Section 4.6)
n.a. = not applicable

The invention claimed is:

1. A method of minimizing the diameter of droplets of a urea solution while spraying by use of a surfactant, characterised in that a mixture of non-ionic surfactants containing a proportion of 10-40 weight % of low alkoxylated compounds with a degree of alkoxylation from 2 to 5 and a proportion of 60-90 weight % of high alkoxylated compounds with a degree of alkoxylation from 8 to 20 is added to the urea solution where the mixture of surfactants is formed from fatty alcohol ethylene oxide adducts and/or fatty amine ethylene oxide adducts and/or ethoxylated alkyl phenols and where the corresponding urea solution remains stable by storage at temperatures down to −11° C.

2. The method according to claim 1, characterised in that the mixture of surfactants are made from ethylene oxide adducts of alcohols with an alkyl chain of 12 to 15 C-atoms.

3. The method according to claim 2, characterised in that the mixture of surfactants is added to the urea solution in an amount of 50 $g/m^3$ to 2000 $g/m^3$.

4. The method according to claim 1, characterised in that the mixture of surfactants contains a proportion of 40% of an ethoxylated oxo alcohol with an alkyl chain of 13 C-atoms and a degree of ethoxylation of 5 and a proportion of 60% of an ethoxylated oxo alcohol with an alkyl chain of 13 C-atoms and a degree of ethoxylation of 10.

5. The method according to claim 4, characterised in that the mixture of surfactants is added to the urea solution in an amount of 50 $g/m^3$ to 2000 $g/m^3$.

6. The method according to claim 1, characterised in that mixture of surfactants contains a proportion of 33% of an ethoxylated oxo alcohol with an alkyl chain of 13 C-atoms and a degree of ethoxylation of 3 and a proportion of 67% of an ethoxylated oxo alcohol with an alkyl chain of 13 C-atoms and a degree of ethoxylation of 12.

7. The method according to claim 6, characterised in that the mixture of surfactants is added to the urea solution in an amount of 50 $g/m^3$ to 2000 $g/m^3$.

8. The method according to claim 1, characterised in that the mixture of surfactants are added to the urea solution in an amount of 50 $g/m^3$ to 2000 $g/m^3$.

9. The method according to claim 1, characterised in that a mixture of non-ionic surfactants containing a proportion of 10-40 weight % of low alkoxylated compounds with a degree of alkoxylation from 2 to 5 and a proportion of 60-90 weight % of high alkoxylated compounds with a degree of alkoxylation from 10 to 15 is added to the urea solution where the mixture of surfactants is formed from fatty alcohol ethylene oxide adducts and/or fatty amine ethylene oxide adducts and/or ethoxylated alkyl phenols and where the corresponding urea solution remains stable by storage at temperatures down to −11° C.

10. A urea solution with a surfactant, characterized in that the mixture of surfactants contains a proportion of 10-40 weight % of low alkoxylated compounds with a degree of alkoxylation from 2 to 5 and a proportion of 60% to 90% of high alkoxylated compounds with a degree of alkoxylation from 8 to 20 and where the mixture of surfactants is formed from fatty alcohol ethylene oxide adducts and/or fatty amine ethylene oxide adducts and/or ethoxylated alkyl phenols and the corresponding urea solution remains stable by storage at temperatures down to −11° C.

11. The urea solution according to claim 10, characterised in that the mixture of surfactants are made from ethylene oxide adducts of alcohols with an alkyl chain of 12 to 15 C-atoms.

12. The urea solution according to claim 11, characterised in that the urea solution contains a mixture of surfactants in an amount of 50 $g/m^3$ to 2000 $g/m^3$.

13. The urea solution according to claim 10, characterised in that the mixture of surfactants contains a proportion of 40% of an ethoxylated oxo alcohol with an alkyl chain of 13 C-atoms and a degree of ethoxylation of 5 and a proportion of 60% of an ethoxylated oxo alcohol with an alkyl chain of 13 C-atoms and a degree of ethoxylation of 10.

14. The urea solution according to claim 13, characterised in that the urea solution contains a mixture of surfactants in an amount of 50 g/m$^3$ to 2000 g/m$^3$.

15. The urea solution according to claim 10, characterised in that mixture of surfactants contains a proportion of 33% of an ethoxylated oxo alcohol with an alkyl chain of 13 C-atoms and a degree of ethoxylation of 3 and a proportion of 67% of an ethoxylated oxo alcohol with an alkyl chain of 13 C-atoms and a degree of ethoxylation of 12.

16. The urea solution according to claim 15, characterised in that the urea solution contains a mixture of surfactants in an amount of 50 g/m$^3$ to 2000 g/m$^3$.

17. The urea solution according to claim 10, characterised in that the urea solution contains a mixture of surfactants in an amount of 50 g/m$^3$ to 2000 g/m$^3$.

18. The urea solution according to claim 10, characterized in that the mixture of surfactants contains a proportion of 10-40 weight % of low alkoxylated compounds with a degree of alkoxylation from 2 to 5 and a proportion of 60% to 90% of high alkoxylated compounds with a degree of alkoxylation from 10 to 15 and where the mixture of surfactants is formed from fatty alcohol ethylene oxide adducts and/or fatty amine ethylene oxide adducts and/or ethoxylated alkyl phenols and the corresponding urea solution remains stable by storage at temperatures down to −11° C.

\* \* \* \* \*